United States Patent [19]

Graham et al.

[11] Patent Number: 4,563,267

[45] Date of Patent: Jan. 7, 1986

[54] PROCESS FOR REDUCING THERMAL SHOCK IN FLUIDIZED BED STEM COILS CYCLED IN AND OUT OF SERVICE

[75] Inventors: James J. Graham, Wayland; Darrell D. Kinzler, Framingham; Edward P. Hunt, North Attleboro, all of Mass.

[73] Assignee: The Badger Company, Inc., Cambridge, Mass.

[21] Appl. No.: 635,550

[22] Filed: Jul. 30, 1984

[51] Int. Cl.[4] ............... C10G 35/22; C10G 11/10; F22B 15/00

[52] U.S. Cl. .................. 208/159; 208/113; 208/153; 122/4 D

[58] Field of Search ............ 422/146, 143; 122/4 D; 208/153, 154, 159, 113, 146

[56] References Cited

U.S. PATENT DOCUMENTS

| | | | |
|---|---|---|---|
| 2,383,636 | 8/1945 | Wurth | 208/159 X |
| 2,506,317 | 5/1950 | Rex | 208/159 X |
| 2,735,743 | 2/1956 | Rex | 208/159 X |
| 2,755,782 | 7/1956 | Campbell et al. | 208/159 X |
| 2,853,455 | 9/1958 | Campbell et al. | 422/143 X |
| 2,926,143 | 2/1960 | Leland | 422/146 X |
| 3,863,606 | 2/1975 | Bryers et al. | 122/4 D |
| 4,009,121 | 2/1977 | Luckenbach | 208/159 X |
| 4,129,098 | 12/1978 | Campbell | 122/4 D |

*Primary Examiner*—D. E. Gantz
*Assistant Examiner*—Glenn A. Caldarola
*Attorney, Agent, or Firm*—Schiller & Pandiscio

[57] ABSTRACT

The invention provides an improved method and apparatus for operating a fluidized bed chemical processing unit of the type having steam generating coils, so as to reduce the occurrence of thermally-induced stresses in the coils and thereby extend the useful life of the coils.

The invention involves causing the tube wall temperature of a coil being brought into service to be lowered from bed temperature prior to initiating water flow in the coil, so as to decrease the thermal shock temperature gradient and thereby reduce the magnitude of thermally-induced stress in the coil.

The invention utilizes a base coil in addition to the steam generating coil that is being cycled, and a pair of steam drums which operate at a pressure differential. The method involves generating saturated steam in the base coil and superheating the saturated steam in the coil being brought on line. Steam is directed from one drum to the other in a predetermined manner so as to provide proper temperature control of the coil being cycled.

18 Claims, 1 Drawing Figure

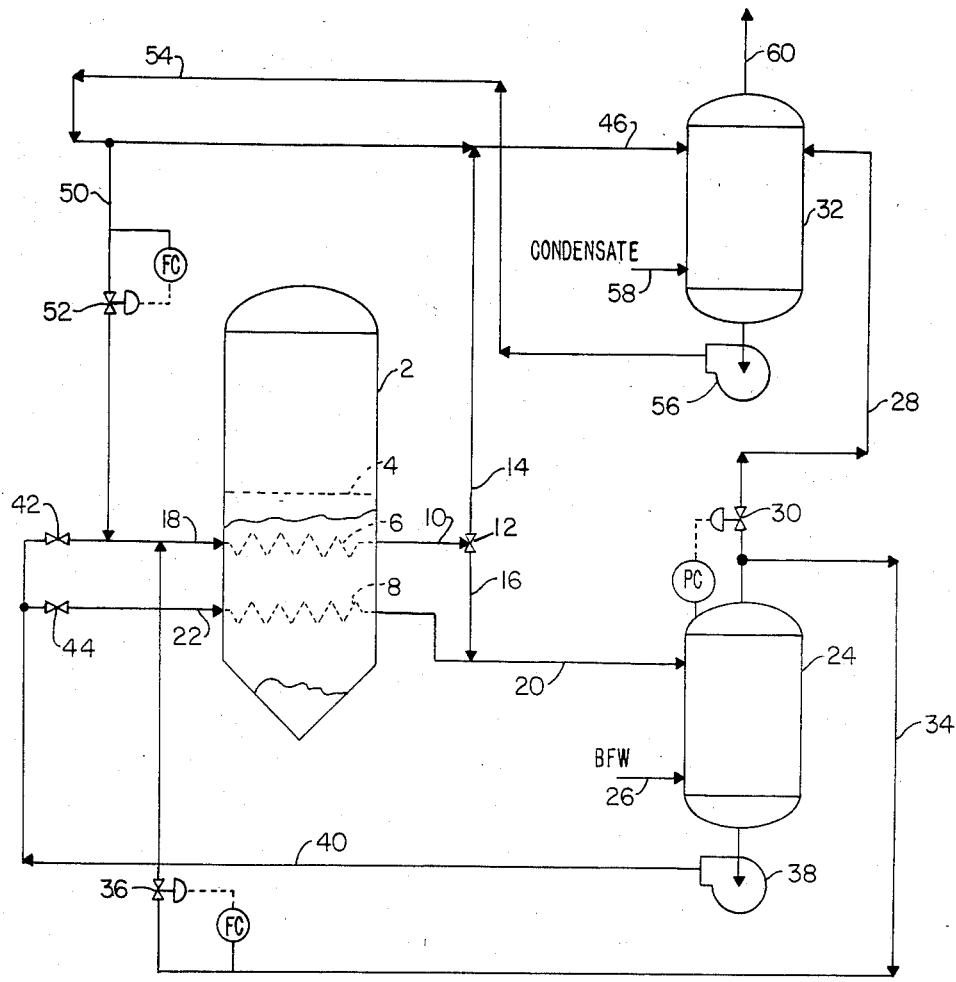

PROCESS FOR REDUCING THERMAL SHOCK IN FLUIDIZED BED STEM COILS CYCLED IN AND OUT OF SERVICE

BACKGROUND OF THE INVENTION

This invention relates to the art of operating fluidized bed reactors and more particularly to an improved method of operating fluid bed reactors equipped with steam coils so as to reduce the thermal shock to which the coils are subjected when brought into service.

Various forms of fluidized bed chemical processing units incorporate coils for cooling or heating purposes. Fluidized bed processing units of the type wherein an exothermic chemical reaction occurs in the bed often employ immersed cooling coils to generate saturated steam. As is well known, even in a continuous process situation a fluidized bed reactor will undergo load changes, e.g., during startup or as a consequence of changes in feedstock composition, etc.. During such load changes it is desireable to modulate the steam generation rate to maintain thermal equilibrium in the reactor. However, the heat transfer coefficient for the cooling coils is largely independent of the fluid dynamic conditions, and the bed side of the cooling coils is substantially insensitive to changes in the fluidizing velocity. A number of methods have been used to modulate the steam generation rate. One method is to slump a section of the bed to increase the bed side heat transfer resistance. Another method is to lower the bed temperature to reduce the driving force. In many processes the foregoing methods are of limited value or unacceptable. Another more common method is to arrange the cooling coils in groups so that the water supply can be cut off to selected coils, in which event the coil will boil off to the dry state and come to bed temperature. That particular method allows steam generation to be varied by discrete steps over a wide range.

However, cycling steam generation coils into and out of service subjects them to thermal shock. Once water flow is initiated the cooling tube wall temperature rapidly drops from the bed temperature to a value near the water temperature, because the heat transfer resistance on the bed or outer side of the cooling tube wall is far greater than it is at the water or inner side of the tube wall. As a result the cooling tube wall is subjected to thermally induced stress. The magnitude of the developed stress is proportional to the temperature change and has a substantial impact on the number of start-up cycles a coil can withstand before it fails. It is necessary to reduce the possibility of coil failure since this in turn can cause overpressurization of the containing vessel and create a hazardous condition for the operating personnel. Frequently the temperature change is as great as 400 to 800 degrees F. and in such cases the useful life of the coil is greatly curtailed as a consequence of the stresses developed during start-up.

OBJECTS AND SUMMARY OF THE INVENTION

The primary object of this invention is to provide a new, safe and improved method of operating a fluidized bed chemical processing unit having steam generation coils so as to reduce the occurrence of thermally-induced stresses and thereby extend the useful life of the coils.

Another object of this invention is to provide an improved method of operating a fluidized bed chemical processing unit of the type described which involves causing the tube wall temperature of a coil being brought into service to be lowered from bed temperature prior to initiating water flow in the coil, so as to decrease the thermal shock temperature gradient and thereby reduce the magnitude of thermally-induced stress in the coil.

These and other objects of the invention are attained by utilizing a base coil in addition to the coil that is being cycled, and a pair of steam drums which operate at a pressure differential. Saturated steam is generated in the base coil and superheated in the coil being brought on line. The method involves directing the steam from one drum to the other in a predetermined manner so as to provide the required temperature control of the coil being cycled.

Other objects and advantages of the invention will be described or rendered obvious by the following detailed description of the invention which is to be considered together with the accompanying drawing.

BRIEF DESCRIPTION OF THE DRAWING

The drawing schematically illustrates a preferred mode of practicing the invention.

DETAILED DESCRIPTION OF THE INVENTION

As noted above, the magnitude of the stress developed in a steam generating coil when it is brought into service by initiating flow of boiler feed water is proportional to the temperature change and has a substantial impact on the number of start-up cycles a coil can withstand before failure. Relating the developed stress to ASME fatigue curves for Alloy 800H gives the following predictions for coil life:

| Thermal Gradient (degrees F.) | Coil Life (No. of Start-up Cycles) |
| --- | --- |
| 900 | 200 |
| 850 | 350 |
| 750 | 550 |
| 700 | 750 |
| 650 | 950 |
| 600 | 1200 |
| 550 | 1600 |
| 500 | 2000 |
| 450 | 2700 |
| 400 | 5000 |

By way of example, a fluidized bed reactor operating at a temperature of 850 degrees F. and having a steam generator coil which is generating 350 psig saturated steam (436 degrees F.), will have a coil start-up temperature gradient of about 400 F. degrees and will be able to withstand about 5000 cycles. However, at a bed temperature of 1350 degrees F., the thermal gradient will shift to 900 F. degrees and only about 200 start-up cycles will be possible. Clearly at higher temperatures the ability to cycle steam generator coils is greatly limited.

It has been determined the foregoing limitation may be overcome by lowering the temperature of the steam generator coil to a level substantially below that of the fluidized bed before initiating flow of boiler feed water through the coil. According to the present invention this is achieved by passing saturated steam through the steam generator coil before boiler feed water is introduced to the coil. This has the effect of lowering the temperature of the coil and also of superheating the steam. The saturated steam is preferably generated by means of an auxiliary steam generator coil disposed within the same fluidized bed. The auxiliary coil in the bed is operated on a base load basis, i.e., water is being constantly introduced and steam is being constantly generated in the auxiliary coil at all times that a reaction is occurring in the bed.

The invention may be practiced in connection with a wide variety of chemical processing units that are characterized by exothermic reactions in a fluidized bed. The invention has particular application to fluidized bed processing units that undergo cyclic changes of operating conditions, e.g., a batch-type catalyst regenerator unit, or a reactor where oxidation and catalyst regeneration reactions are conducted at different times. The invention also has application where the steam generator coil is kept out of service after a reactor has been activated until the reactor has been brought up to operating temperature. The invention may be incorporated in reactors that have a single catalyst bed or multiple beds. It also may be incorporated in fixed catalyst bed reactors. By way of example, the invention may be used in connection with a fluidized bed reactor that functions as a catalytic cracking unit regenerator or as an oxidation or hydrogenation reactor. Accordingly, it is to be appreciated that the invention has a number of other applications, many of which will be obvious to persons skilled in the art.

Referring now to the drawing, the illustrated system comprises a reactor 2 with a fluidized bed whose upper level is illustrated schematically by the dotted line 4. Although omitted from the drawing for reasons of clarity, it is to be understood that the reactor has lines for introducing one or more reactants and a gas for fluidizing the bed and a line for removing the reactor effluent. Disposed within the reactor and immersed in the fluidized bed are two coils 6 and 8. Coil 6 is a steam generator coil which is expected to be cycled in and out of service a number of times during or as a consequence of operation of the reactor. Coil 8 is an auxiliary steam generator coil provided in accordance with the invention. Coil 8 is operated on a base load basis, i.e., boiler feed water is circulated through it continuously so long as an exothermic reaction is occurring in the bed.

One end of coil 6 is connected via valve 12 to two lines 14 and 16. The other end of coil 6 is connected to a line 18. One end of coil 8 is connected to a line 20, while its opposite end is connected to a line 22. Line 16 is connected to line 20 and the latter is connected to an input port of a first steam drum 24. The latter has a second input port which is connected to a boiler feed water line 26. Drum 24 has a top steam output port which is connected by a line 28 having a pressure-regulating valve 30 to an input port of a second steam drum 32. The top steam output port of drum 24 also is connected by a line 34 and a flow control valve 36 to line 18. Drum 24 also has a bottom condensate port which is connected by a pump 38, a line 40 and a valve 42 to line 18. Line 40 also is connected to line 22 by valve 44.

Steam drum 32 has a steam input line 46 which is connected to line 14 so as to permit the drum to receive steam from coil 6. Line 46 also is connected (a) via a line 50 and a flow control valve 52 to line 18, and (b) via a line 54 and a pump 56 to the condensate output line of drum 32. The latter has an input port to which is connected a condensate input line 58, and a steam output port which is connected via a line 60 to a header (not shown). The pressure in drum 24 is controlled so that drum 24 operates at a higher pressure than drum 32, with the pressure differential between the two drums being at least a modicum greater than the pressure drop across heat generator coil 6.

Utilizing the arrangement shown in the drawing, it is possible to lower the tube wall temperature of coil 6 to substantially below the temperature of the bed before the coil is brought into service, i.e., before initiating water flow through the coil, with the result that the amount of thermal shock to which the coil is subjected when it is brought into service is substantially reduced.

The method of the present invention whereby thermal stress is reduced will now be described.

Assume that reactor 2 is in operation so that an exothermic reaction is occurring in its fluidized bed, coil 6 is out of service, i.e, no water or steam is circulating through it, and boiler feed water is being continually delivered to drum 24 and passed therefrom into coil 8 where it is partially converted to high pressure saturated steam. This steam is continually passed into drum 24 where it is separated into dry steam and water. The steam is removed from the system and delivered to a common header or utilization apparatus via lines 28 and 60 and drum 32. The header or utilization apparatus is operated at the pressure at which it is desired to utilize the steam generated by recovery of heat from the exothermic reaction occuring in reactor 2. During this phase of operation the valves 36, 42 and 52 are closed, as is preferably valve 12.

Assume now that it is desired to bring coil 6 into service. The method of the present invention consists of a number of steps which are described below.

The first step of the method is to direct dry saturated steam from drum 24 through coil 6 to drum 32. This is achieved by opening valve 12 and flow control valve 36. Valve 42 is kept closed. This flow of dry saturated steam to coil 6 is continued until the coil has been cooled to an acceptable level below the bed temperature. When that temperature level has been achieved, the second step is taken.

The second step is to initiate flow of condensate to coil 6 from drum 32 (via lines 54 and 50 and flow control valve 52). Valve 36 remains open. The flow of condensate into coil 6 is commenced at a slow rate and is gradually increased. Preferably the flow of condensate is increased until about 50-80%, preferably 80%, of the condensate is vaporized. During this increase in condensate flow into coil 6, the flow of steam to coil 6 from drum 24 is gradually reduced to zero via flow control valve 36. The steam generated in coil 6 is fed to steam drum 32. When the desired level of vaporization is achieved, the third step is taken.

This third step is to direct the saturated high pressure steam generated from condensate in coil 6 to the high pressure drum 24.

The fourth step, which may be carried out simultaneously with or immediately after the third step, is to stop the flow of condensate into coil 6 from drum 32 and to introduce boiler feed water into coil 6 from drum 24. This involves closing valve 52 and opening valve 42.

As a consequence of the foregoing method, the steam generator coil 6, commencing from an out of service state, has its temperature reduced in a controlled manner by passing through it some of the steam generated in base coil 8. Once it has had its temperature lowered, it is subjected to inflow of condensate rather than boiler feed water. This is done because condensate has a lower concentration of scale-forming impurities than does ordinary boiler feed water. Once a wet steam is being formed in coil 6, it is possible to replace the condensate with boiler feed water since then the vaporization state and temperature is not conducive to scale formation.

A significant aspect of the system shown in the drawing is that switching coil 6 out of service can be done conveniently and efficiently. All that is required to bring the coil out of service is to terminate flow of boiler feed water and initiate flow of condensate into coil 6 from drum 32, terminate the flow of condensate into coil 6 after the latter has been flushed clean of boiler feed water, and allow the coil to boil to dryness.

By way of example, it has been determined that by judiciously selecting the sizes of coils 6 and 8 in a catalytic cracking unit, it has been possible to reduce the temperature gradient incurred by coil 6 during start-up by a minimum of 200 F. degrees. This temperature gradient reduction has in turn resulted in an increase of coil life by a factor of 3 to 4. The coil life may be further increased by reducing the bed temperature since reducing the bed temperature reduces the thermal gradient.

It is to be understood that as an alternative measure, the second step of the method may be modified by introducing de-mineralized water into the system via line 58 instead of employing condensate in the second step of the method as above-described.

Obviously the invention may be modified and practiced in a manner other than as described above. Thus the invention may be practiced in a variety of process systems which utilize fluidized beds in which cooling coils are embedded. The fluidized beds need not be catalyst beds; they may be inert beds. Also the beds need not be fluidized beds, although the invention is most advantageous when associated with a fluidized bed system. Thus the bed may be of the fixed or travelling variety. Persons skilled in the art will also appreciate that coil 6 is merely exemplary, and that in practice coil 6 may consist of two or more coils installed in a bed and connected in parallel or in series. The same is true of coil 8.

Still other changes in equipment or operating steps may be accomplished without departing from the apparatus or method of this invention.

In the following claims, the term "service coil" or "service steam generator coil" designates steam generator coil 6 or equivalent, and is intended to distinguish from base load or auxiliary coil 8.

What is claimed is:

1. In the operation of a reactor having (1) a fluidized bed in which an exothermic reaction is occurring and (2) a service steam generator coil in said bed which is cycled into and out of service, the method of reducing the magnitude of the thermal shock induced in said service coil as it is brought into service comprising the steps of:
    (a) generating steam by continuously passing water through a second coil disposed in said bed;
    (b) superheating said steam and cooling said service coil by passing said steam through said service coil;
    (c) directing said superheated steam to a header; d initiating flow of water to said service coil while maintaining a flow of steam to said service coil from said second coil;
    (d) terminating flow of steam from said second coil to said service coil and maintaining said flow of water to said service coil so that about 50-80% of said water is vaporized into steam; and
    (e) directing to said header the steam generated in said service coil by vaporization of said water.

2. In the operation of a chemical processing unit having (1) a fluidized bed in which an exothermic reaction is occurring and (2) a service steam generator coil in said bed which is cycled into and out of service, the method of reducing the magnitude of the thermal shock induced in said service coil as it is brought into service comprising the steps of:
    (a) generating saturated steam by continuously passing boiler feed water through a second coil disposed in said bed;
    (b) separating said saturated steam into a dry steam and water;
    (c) superheating said dry steam and cooling said service coil by passing said dry steam through said service coil;
    (d) initiating flow of de-mineralized water or steam condensate to said service coil;
    (e) terminating flow of said dry steam to said service coil;
    (f) maintaining a flow of said de-mineralized water or steam condensate to said service coil so that about 50-80% of said water is vaporized into steam; and
    (g) thereafter terminating the flow of said de-mineralized water or steam condensate to said service coil and initiating a flow of boiler feed water to said service coil.

3. A method according to claim 2 wherein the saturated steam generated in said second coil is separated into dry steam and water in a steam drum.

4. A method according to claim 3 wherein the steam generated in said service coil by vaporization of said de-mineralized water or steam condensate is directed to a second steam drum.

5. A method according to claim 2 wherein said reactor bed has a temperature in excess of the temperature of the steam generated in both of said coils.

6. A method according to claim 2 wherein said chemical processing unit is a catalytic cracking unit regenerator.

7. A method according to claim 2 wherein said chemical processing unit is a fluidized bed reactor.

8. In the operation of a reactor having (1) a fluidized bed in which an exothermic reaction is occurring and (2) a service steam generator coil in said bed which is cycled into and out of service, the method of reducing the magnitude of the thermal shock induced in said service coil as it is brought into service comprising the steps of:
    (a) generating a wet steam in a second coil disposed in said bed by continuously passing water to said second coil;
    (b) passing said wet steam from said second coil to a first steam drum and separating said wet steam in said first steam drum into a dry steam and a steam condensate;
    (c) superheating said dry steam and cooling said service coil to a first temperature level by passing said dry steam through said service coil;
    (d) directing said superheated steam to a second steam drum;
    (e) recovering water condensate from said superheated steam in said second steam drum and directing the condensate-denuded steam in said second steam drum to a header;

(f) initiating flow of water condensate from second steam drum to said service coil while maintaining the flow of dry steam to said service coil from said first steam drum;

(g) terminating flow of dry steam from said first steam drum to said service coil while maintaining the flow of condensate from said second drum to said service coil at a rate such that about 50–80% of said condensate is vaporized into steam in said service coil, and directing the steam produced in said service coil to said second steam drum;

(h) terminating the flow of condensate from said second steam drum to said service coil;

(i) initiating the flow of boiler feed water to said service coil and maintaining that flow at a rate such that the boiler feed water is converted to saturated steam in said service coil; and (j) directing the saturated steam generated in said service coil to said first steam drum.

9. A method according to claim 8 wherein said boiler feed water is delivered to said service coil via said first steam drum.

10. A method according to claim 9 wherein said first steam drum operates at a higher pressure than said second steam drum.

11. A method according to claim 10 wherein the pressure differential across said first and second steam drums is greater than the pressure drop across said service coil.

12. A method according to claim 11 wherein steam generated by vaporization of said boiler feed water in said service coil is directed from said first steam drum to said header.

13. A method according to claim 12 wherein said steam is directed from said first steam drum to said header via said second drum.

14. In the operation of a chemical processing unit having (1) a fluidized bed in which an exothermic reaction is occurring and (2) a service steam generator coil in said bed which is cycled into and out of service, the method of reducing the magnitude of the thermal shock induced in said service coil as it is brought into service comprising the steps of:

(a) generating steam by continuously passing boiler feed water through a second coil disposed in said bed;

(b) superheating said steam and cooling said service coil by passing said steam through said service coil;

(c) recovering said superheated steam;

(d) terminating the flow of steam from said second coil to said service coil and feeding a cooling water having a lower concentration of scale-forming impurities than ordinary boiler feed water to said service coil at a rate at which it will further cool said service coil and a substantial portion thereof will be converted to a saturated steam;

(e) terminating the flow of said cooling water to said service coil and initiating flow of boiler feed water to said service coil at a rate such that a substantial portion of said cooling water is converted to steam; and (f) recovering the steam generated by vaporization of said cooling water and said boiler feed water.

15. A method according to claim 14 wherein the steam generated in said second coil is a wet steam, and further wherein said wet steam is separated into dry steam and water in a steam drum, and said dry stem is passed to said service coil.

16. A method according to claim 15 wherein said cooling water is de-mineralized water or steam condensate.

17. In the operation of a reactor having (1) a fluidized bed in which an exothermic reaction is occurring and (2) a service steam generator coil in said bed which is cycled into and out of service, the method of reducing the magnitude of the thermal shock induced in said service coil as it is brought into service comprising the steps of:

(a) continuously circulating boiler feed water through said second coil so as to generate a saturated steam in a second coil;

(b) passing said saturated wet steam from said second coil to a first steam drum and separating said wet steam in said first steam drum into a dry steam and a steam condensate;

(c) superheating said dry steam and cooling said service coil to a first temperature level by passing said dry steam through said service coil;

(d) directing said superheated steam to a second steam drum;

(e) recovering water condensate from said superheated steam in said second steam drum and directing the condensate-denuded steam in said second steam drum to a header;

(f) initiating a flow of cooling water having a lower concentration of scale-forming impurities than boiler feed water to said service coil while maintaining the flow of dry steam to said service coil from said first steam drum, whereby at least a portion of said cooling water is vaporized into steam;

(g) terminating flow of dry steam from said first steam drum to said service coil while maintaining the flow of cooling water to said service coil at a rate such that about 50–80% of said cooling water is vaporized into steam in said service coil and said service coil is cooled to a second temperature level below said first temperature level;

(h) directing the steam produced in said service coil from said cooling water to said second steam drum;

(i) terminating the flow of cooling water to said service coil;

(j) initiating a flow of boiler feed water through said service coil so that said boiler feed water is converted to saturated steam in said service coil; and (k) directing the saturated steam generated in said service coil from said boiler feed water to said first steam drum.

18. A method according to claim 17 wherein said cooling water is de-mineralized water or the condensate recovered in said second steam drum, and said boiler feed water is delivered to said service coil together with condensate recovered in said first steam drum.

* * * * *

UNITED STATES PATENT AND TRADEMARK OFFICE
CERTIFICATE OF CORRECTION

PATENT NO. : 4563267
DATED : January 7, 1986
INVENTOR(S) : James J. Graham et al It is certified that error appears in the above-identified patent and that said Letters Patent is hereby corrected as shown below:

Claim 1, column 5, line 63, the letter "d" should be in parentheses and should commence a new clause.

Claim 1, column 5, line 67, "(d)" should be changed to -- (e) --.

Claim 1, column 6, line 3, "(e)" should be changed to -- (f) --.

Claim 15, column 8, line 6, the word "stem" should be changed to -- steam --.

Signed and Sealed this

Twenty-second Day of April 1986

[SEAL]

Attest:

DONALD J. QUIGG

Attesting Officer   Commissioner of Patents and Trademarks